(12) United States Patent
Zhou

(10) Patent No.: US 9,541,788 B2
(45) Date of Patent: Jan. 10, 2017

(54) DISPLAY DEVICE, DISPLAY PANEL AND FABRICATING METHOD THEREOF

(71) Applicant: BOE TECHNOLOGY GROUP CO., LTD., Beijing (CN)

(72) Inventor: Xiaodong Zhou, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 34 days.

(21) Appl. No.: 14/429,943

(22) PCT Filed: May 28, 2014

(86) PCT No.: PCT/CN2014/078710
§ 371 (c)(1),
(2) Date: Mar. 20, 2015

(87) PCT Pub. No.: WO2015/109713
PCT Pub. Date: Jul. 30, 2015

(65) Prior Publication Data
US 2016/0018694 A1 Jan. 21, 2016

(30) Foreign Application Priority Data
Jan. 22, 2014 (CN) .......................... 2014 1 0031108

(51) Int. Cl.
*G02F 1/1335* (2006.01)
*G02F 1/1339* (2006.01)
*G02F 1/1333* (2006.01)

(52) U.S. Cl.
CPC ..... *G02F 1/133512* (2013.01); *G02F 1/13394* (2013.01); *G02F 1/133514* (2013.01);
(Continued)

(58) Field of Classification Search
CPC ................... G02F 1/133512; G02F 1/133514; G02F 1/13394; G02F 2202/36; G02F 2001/133354; G02F 2001/13398
See application file for complete search history.

(56) References Cited

U.S. PATENT DOCUMENTS

| | | | |
|---|---|---|---|
| 9,372,368 B2 * | 6/2016 | Zhou | .................. G02F 1/13394 |
| 2007/0216847 A1 | 9/2007 | Chang et al. | |
| 2011/0211147 A1 | 9/2011 | Kim et al. | |

FOREIGN PATENT DOCUMENTS

| | | |
|---|---|---|
| CN | 101676775 A | 3/2010 |
| CN | 201853031 U | 6/2011 |

(Continued)

OTHER PUBLICATIONS

International Search Report and Written Opinion of the International Searching Authority with Notice of Transmittal of the International Search Report and Written Opinion of PCT/CN2014/078710 in Chinese, mailed Oct. 27, 2014.

(Continued)

*Primary Examiner* — Donald Raleigh
*Assistant Examiner* — Kevin Quarterman
(74) *Attorney, Agent, or Firm* — Collard & Roe, P.C.

(57) ABSTRACT

A display device, a display panel and the fabricating method thereof The display panel comprises a first substrate (110) and a second substrate (120) disposed to be cell assembled; and a magnetic unit including a first magnetic subunit (11, 12) disposed on the first substrate (110) and a second magnetic subunit (21, 22) disposed on the second substrate (120) The first magnetic subunit (11, 12) and the second magnetic subunit (21, 22) are disposed to be opposed to each other First magnetic particles (15) are dispersed in the first magnetic subunit (11, 12); and second magnetic particles (25) are dispersed in the second magnetic subunit (21, 22); and the first magnetic particles (15) and the second magnetic particles (25) have opposite magnetic polarities such that the (Continued)

first magnetic subunit (11, 12) and the second magnetic subunit (21, 22) attract each other.

13 Claims, 2 Drawing Sheets

(52) U.S. Cl.
CPC .............. *G02F 2001/13398* (2013.01); *G02F 2001/133354* (2013.01); *G02F 2202/36* (2013.01)

(56) References Cited

FOREIGN PATENT DOCUMENTS

| | | |
|---|---|---|
| CN | 202486472 U | 10/2012 |
| CN | 103293777 A | 9/2013 |
| JP | H 5-134248 A | 5/1993 |

OTHER PUBLICATIONS

Written Opinion of the International Searching Authority of PCT/CN2014/078710 in Chinese with English translation mailed Oct. 27, 2014.

Chinese Office Action in Chinese Application No. 201410031108.7 mailed Dec. 30, 2015 with English translation.

\* cited by examiner

DISPLAY DEVICE, DISPLAY PANEL AND FABRICATING METHOD THEREOF

CROSS REFERENCE TO RELATED APPLICATIONS

This application is the National Stage of PCT/CN2014/078710 filed on May 28, 2014, which claims priority under 35 U.S.C. §119 of Chinese Application No. 201410031108.7 filed on Jan. 22, 2014, the disclosure of which is incorporated by reference.

FIELD

The present disclosure relates to a display device, a display panel and a fabricating method thereof.

BACKGROUND

In liquid crystal display technology, dark state performance of a liquid crystal device has a significant impact on its display performance, which directly affects contrast and viewing angle.

SUMMARY OF THE INVENTION

One aspect of the present disclosure provides a display panel comprising: a first substrate and a second substrate disposed to be cell assembled; and a magnetic unit including a first magnetic subunit disposed on the first substrate and a second magnetic subunit disposed on the second substrate, the first magnetic subunit and the second magnetic subunit being disposed to be opposed to each other. First magnetic particles are dispersed in the first magnetic subunit; and second magnetic particles are dispersed in the second magnetic subunit; and the first magnetic particles and the second magnetic particles have opposite magnetic polarities such that the first magnetic subunit and the second magnetic subunit attract each other.

For example, the first magnetic subunit and the second magnetic subunit have a matrix formed of a resin material, respectively.

The first magnetic particles are dispersed in the resin material of the first magnetic subunit.

The second magnetic particles are dispersed in the resin material of the second magnetic subunit.

For example, the magnetic unit is a black matrix and/or a spacer.

For example, the first magnetic subunit is a black matrix, the first substrate is a color filter substrate, the second magnetic subunit is a spacer, and the second substrate is an array substrate.

For example, both the first magnetic subunit and the second magnetic subunit comprise a hard magnetic nano-particle layer and a soft magnetic metal shell layer; the soft magnetic metal shell layer has a permeability greater than a permeability of the hard magnetic nano-particle layer, and the soft magnetic metal shell layer is positioned both in periphery of the hard magnetic nano-particle layer and between the hard magnetic nano-particle layer and the substrate of the magnetic subunit'.

For example, both the first magnetic particles and the second magnetic particles are formed of a hard magnetic material.

For example, the first magnetic particles and the second magnetic particles have a particle diameter of 100-2000 nanometers, respectively.

In another aspect, the present disclosure provides a display device comprising a display panel described as above.

In yet another aspect, the present disclosure provides a method of fabricating a display panel comprising: step S1, providing a resin material, first magnetic particles and an organic solvent; step S2, dissolving the resin material in the organic solvent and dispersing the first magnetic particles in the organic solvent dissolved with the resin material to form a mixture solution; step S3, applying the mixture solution on a surface of a first substrate; step S4, curing the mixture solution applied on the first substrate; step S5, forming a pattern of a first magnetic subunit on the first substrate; step S6, performing a magnetization treatment on the first substrate such that the first magnetic particles in the first magnetic subunit have a uniform first magnetic polarity; step S7: forming a pattern of second magnetic subunit on a second substrate according to a process of steps 1-5; step S8: performing a magnetization treatment on the second substrate such that the second magnetic particles in the second magnetic subunit have a uniform second magnetic polarity, the second magnetic polarity being opposite to the first magnetic polarity; and step S9: cell assembling the first substrate and the second substrate.

For example, step S6 and step S8 are performed after step S9 is finished.

According to the present disclosure, by configuring the first magnetic subunit and the second magnetic subunit with opposite magnetic polarities to form a complete structure layer, the displacement of the structure layer under an external force is substantially avoided. Alternatively even if the displacement occurs, the structure can return to the original position due to the magnetic attraction. Therefore, the stability of the structure layer is effectively increased and the product performance is enhanced.

DESCRIPTION OF THE EMBODIMENTS

The technical solution of the embodiments of the present disclosure will be described clearly and fully in connection with the drawings of the embodiments of the present disclosure. It is obvious that the described embodiments are just a part but not all of the embodiments of the present disclosure. Based on the embodiments of the present disclosure, those skilled in the art can obtain all other embodiment without any inventive work, which all fall into the scope of the claimed invention.

Unless otherwise defined, technical terms or scientific terms used herein shall have a common meaning known by those skilled in the art of the present disclosure. Words and expressions such as "first", "second" and the like used in the description and claims of the patent application of the present disclosure do not denote any sequence, quantity or importance, but distinguish different components. Likewise, words such as "a", "an" and the like do not denote quantitative restrictions, but denote the presence of at least one. Words such as "connected", "connecting" and the like are not restricted to physical or mechanical connections, but may include electrical connections, regardless of direct or indirect connections. Words such as "up", "below", "left", "right", etc., are only used to denote the relative positional relationship. Upon the absolute positional change of the described object, the relative positional relationship change correspondingly.

Figure 1:
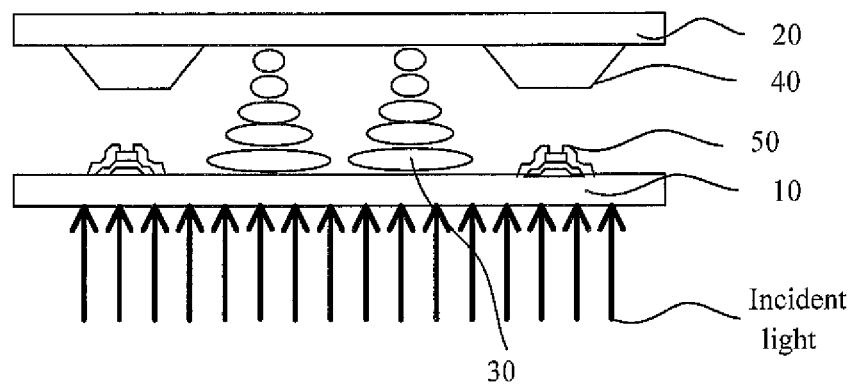
FIG. 1 is a schematic view of a pixel region under an ideal dark state.

Referring to FIG. 1, a liquid crystal device has a brightness value of zero under an ideal dark state. That is, an incident light 10 from a back light source has a light intensity of zero through a lower polarizer 10, a liquid crystal layer 30 and an upper polarizer 20. A black matrix 40 positioned on a color filter substrate completely opposes a TFT 50 positioned on an array substrate. In an actual liquid crystal device, due to the structure of the TFT 50 in the peripheral region of the pixel, a step difference exists on the lower substrate such that the liquid crystal molecules are not uniformly oriented. Alternatively, the liquid crystal molecules are affected by voltage of the gate electrode of the TFT 50 such that a light leakage phenomenon exists in such region.

In order to reduce the light leakage and enhance the display quality, a black matrix (BM) for blocking the leaked light is disposed at a position corresponding to peripheral region of the pixels leaking light on the color filter substrate. The black matrix can be formed of a black resin material with a good light absorption ability by for example spin coating and lithography.

Figure 2:
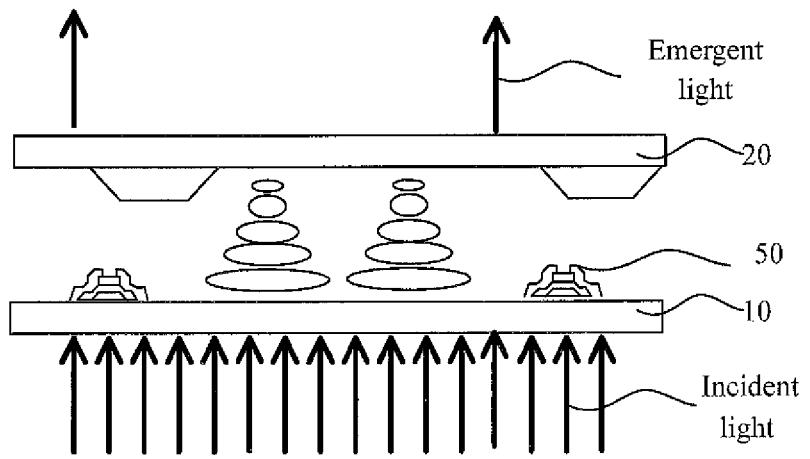
FIG. 2 is a schematic view of mura when the black matrix horizontally displaces.
Figure 3:
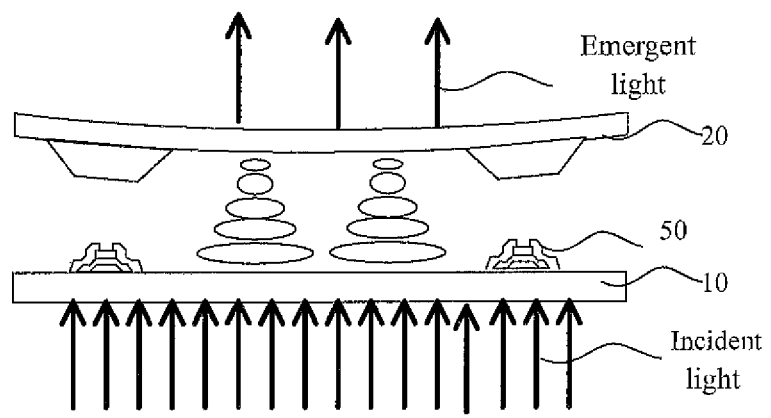
FIG. 3 is a schematic view showing light leakage caused by the change of the thickness of the cell when it is subjected to an external force.

In a case where the black matrix is precisely positioned, the black matrix structure can function well to reduce the light leakage. However, in an actual process, the display panel is frequently subjected to an external force such that:

(1) the black matrix subjected to the external force displaces in a horizontal direction and can not recover after the external force is removed, and the black matrix loses the functionality of blocking the leaked light in the peripheral of pixels, as illustrated in FIG. 2;

(2) the liquid crystal cell subjected to the external force changes in the thickness and can not recover quickly after the external force is removed, and the light leakage occurs, which is particularly prominent for large size panel, as illustrated in FIG. 3.

In summary, the black matrix structure can not solve the problem of mura when the panel displaces in the horizontal direction. Moreover, the problem existing in the black matrix will also exist in a spacer or other structural layer.

A specific implementation of the present disclosure is further described as below in details in combination of the drawings and embodiments. The following embodiments are intended to illustrate the present disclosure, not to limit the scope of the present disclosure.

The present disclosure provides a display panel comprising: a first substrate and a second substrate disposed to be cell assembled; and a magnetic unit including a first magnetic subunit disposed on the first substrate and a second magnetic subunit disposed on the second substrate, the first magnetic subunit and the second magnetic subunit being disposed to be opposed to each other. First magnetic particles are dispersed in the first magnetic subunit; and second magnetic particles are dispersed in the second magnetic subunit; and the first magnetic particles and the second magnetic particles have opposite magnetic polarities such that the first magnetic subunit and the second magnetic subunit attract each other.

The principle of the magnetic unit is described as below in details.

Both magnetic field and electric field exist in nature. However, the magnetic field and electric field exist independently such that magnetic field and electric field do not affect each other in the field distribution. The interaction between them is represented as an interaction of force. Macroscopically, the force can be illustrated as a relationship between the magnetic field and the current, that is the Faraday's Law of Electromagnetic Induction. Microscopically, the force can be illustrated as a relationship between the magnetic field and charge in motion, that is, the Lorenz' Law.

Macroscopically, according to the mathematical equation of Ampere's Law: F=BIL·sin θ, it is known that the magnetic field can only act on a current having a direction with an angle relative to the magnetic field direction, and can not act on the current having a direction parallel to the magnetic field direction.

Microscopically, according to the mathematical equation of Lorenz's Law: f=Bqv·sin θ, it is also known that the magnetic field can only act on the charge in motion having a motion direction with an angle relative to the magnetic field direction, and can not act on the charge in motion having a motion direction parallel to the magnetic field direction.

(1) The effect on the electrical field distribution: according to the above viewpoint, in a displaying period when the pixel charging is finished and after the TFT is turned off, only static charges exists on the surface of the pixel electrode in the pixel region. The static charges and the magnetic field do not interact with each other, that is, the magnetic field in the present design does not affect the electric field distribution such that the liquid crystal molecules still achieve the display functionality with the presence of the electric field.

(2) The effect on the electric current: during charging, due to the current in motion, in a case where the current direction is at an angle relative to the magnetic field direction, the magnetic field will apply a force F on the charge. The force has a direction perpendicular to the current direction (that is, the Hall Effect, which induces charge to be distributed on one side of a conductor but does not affect the transportation efficiency in the current direction). In a case where the current direction is parallel to the magnetic field direction, there is no force. In a display structure, one of the gate signal and the data signal is always transmitted in a direction perpendicular to the magnetic field of some magnetic poles and the other one of the gate signal and the data signal is transmitted in a direction parallel to the magnetic field of some magnetic poles. Whatever the case is, the magnetic field will not affect the transmission of the current, that is, the magnetic field will not affect the charging efficiency.

According to the present disclosure, by configuring the first magnetic subunit and the second magnetic subunit with opposite magnetic polarities to form a complete structure layer, the displacement of the structure layer under an external force is substantially avoided. Alternatively even if the displacement occurs, the structure can return to the original position due to the magnetic attraction. Therefore, the stability of the structure layer is effectively increased and the product performance is enhanced.

First Embodiment

The magnetic unit in the embodiment is for example a black matrix.

The display panel according to the embodiment comprises a first substrate 110 and a second substrate 120 disposed to be cell assembled; and a liquid crystal 30 filled between the first substrate 110 and the second substrate 120.

Figure 4:
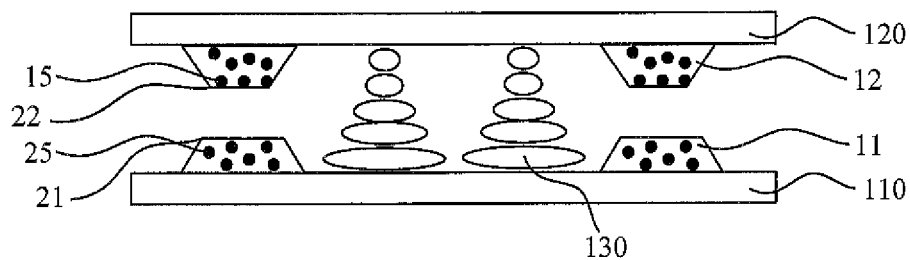
FIG. 4 is a structural schematic view of a display panel according to a first embodiment.

As illustrated in FIG. 4, the black matrix includes first magnetic subunits 11, 12 disposed on the first substrate 110 and second magnetic subunits 21, 22 disposed on the second substrate 120, the first magnetic subunits 11, 12 and the second magnetic subunits 21, 22 are disposed to be opposed to each other.

First magnetic particles 15 are dispersed in the first magnetic subunits 11, 12 and second magnetic particles 25 are dispersed in the second magnetic subunits 21, 22. The first magnetic particles 15 and the second magnetic particles 25 have opposite magnetic polarities. By the interaction between the first magnetic particles 15 and the second magnetic particles 25, the first magnetic subunits 11, 12 and the second magnetic subunits 21, 22 attract each other, respectively.

Figure 5:
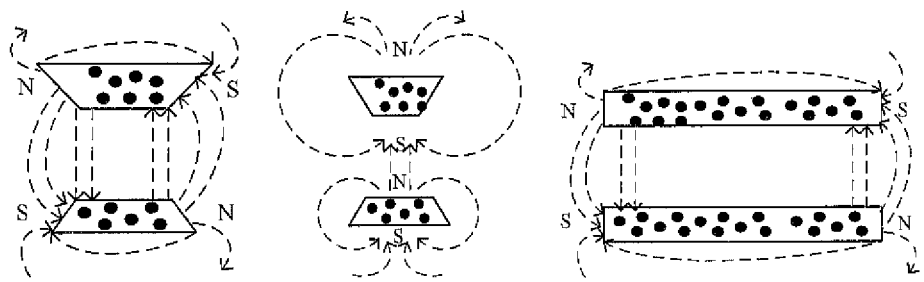
FIG. 5(a)-5(c) is schematic views of magnetic field lines of a black matrix structure.

The N and S in FIG. 5(a)~FIG. 5(c) represent north poles and south poles of the first magnetic subunits 11, 12 and the second magnetic subunits 21, 22. The black clotted line with an arrow represents a magnetic induction direction.

Both the first magnetic subunits 11, 12 and the second magnetic subunits 21, 22 can have a matrix formed of a resin material or polymer, for example, polymethylmethacrylate material. The first magnetic particles 15 are dispersed in the resin material or polymer and the second magnetic particles 25 are dispersed in the resin material or polymer.

Both the first magnetic particles 15 and the second magnetic particles 25 can be formed of a hard magnetic material such that the first magnetic subunits 11, 12 and the second magnetic subunits 21, 22 have a strong residual magnetic field or maintain a constant magnetic polarity. The hard magnetic material is for example $\gamma\text{-}Fe_3O_4$. The first magnetic particles 15 and the second magnetic particles 25 have a particle size of 100-2000 nanometers, respectively.

Figure 6:
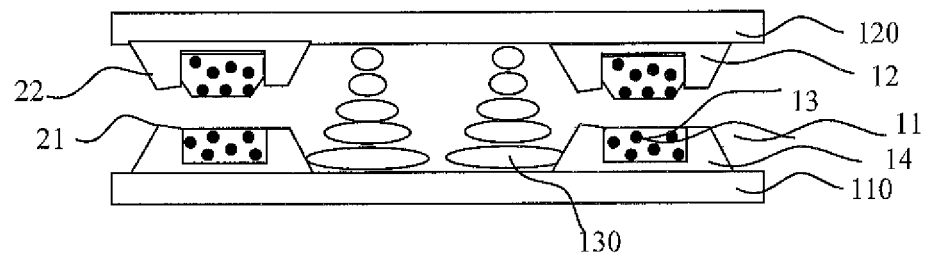
FIG. 6 is a schematic view of a layered structural of the black matrix in the display panel according to the first embodiment.

In addition, as illustrated in FIG. 6, both the first magnetic subunits 11, 12 and the second magnetic subunits 21, 22 can have two portions. For example, the magnetic subunit 11 includes a hard magnetic nano-particle layer 13 and a soft magnetic metal shell layer 14. The soft magnetic metal shell layer 14 is positioned both in the periphery of the hard magnetic nano-particle layer 13 and between the first substrate 110 and the hard magnetic nano-particle layer 13. The soft magnetic metal shell layer 13 has a permeability greater than one of the hard magnetic nano-particle layer 14. Therefore, most of the magnetic lines pass through the soft magnetic metal shell layer 13 and concentrate at the opening of the soft magnetic metal shell layer 13. In this way, the magnetic lines at the TFT device become very few such that the magnetic shielding is achieved.

The first substrate 110 can be a color filter substrate or an array substrate; and the second substrate 120 can be correspondingly an array substrate or a color filter substrate.

With the interaction between the first magnetic particles 15 and the second magnetic particles 25 having opposite magnetic polarities, the first magnetic subunits 11, 12 can tightly attract the second magnetic subunits 21, 22. When the first substrate and the second substrate are subjected to an external force, the first magnetic subunits 11, 12 and the second magnetic subunits 21, 22 will not easily be displaced in a transverse direction such that a uniform thickness between the first substrate 110 and the second substrate 120 is maintained. Therefore, the light leakage in the peripheral region of pixels can be avoided. Even if a transverse displacement between the first magnetic subunits 11, 12 and the second magnetic subunits 21, 22 occurs due to an excessively large external force, the first magnetic subunits 11, 12 and the second magnetic subunits 21, 22 will quickly return to the original positions when the external force is removed. The displaced black matrix will quickly return to the initial position such that the light leakage in the peripheral region of pixels can be avoided.

Second Embodiment

The present embodiment is substantially the same as the first embodiment, except that the magnetic unit in the present embodiment is a spacer. The spacer is has the same configuration as the black matrix, which is not described herein in details.

Third Embodiment

The present embodiment is substantially the same as the first embodiment, except that the first magnetic subunit is a black matrix and the second magnetic subunit is a spacer in the embodiment. The black matrix is disposed on a color filter substrate and the spacer is disposed on an array substrate. First magnetic particles are dispersed in the black matrix and second magnetic particles are dispersed in the spacer. The first magnetic particles and the second magnetic particles have opposite magnetic polarities. With the interaction of the first magnetic particles and the second magnetic particles having opposite magnetic polarities, the black matrix and the spacer can be attracted together.

It should be noted that the magnetic unit is described as a certain part in the above embodiments is not intended that all of the certain parts are magnetic units. For example, the magnetic unit in the first embodiment a black matrix, but not all black matrixes must be magnetic units. It is possible that some of the black matrixes are magnetic units. Which black matrixes are magnetic units can be determined by those skilled in the art, as long as it is ensured that the two magnetic units on the two substrates are correspondingly disposed.

A method of fabricating the display panel according to the present disclosure will be described in detail as below in an example of using the magnetic unit as the black matrix. The method comprises the following steps.

Step S1: a resin material, first magnetic particles and an organic solvent are provided. The magnetic particles can be formed by a high temperature thermal decomposition method, a hydrothermal method, a co-deposition method or a mechanical method.

Step S2: the resin material is dissolved in the organic solvent, and the first magnetic particles are dispersed in the organic solvent dissolved with the resin material by way of stirring to form a mixture solution.

The organic solvent can have a solid content of for example about 6% of the total weight. The solid content can be optimized depending on actual situation. The magnetic particle can have a total content of for example about 5-50% of total weight of the magnetic resin. The content of the magnetic particle can be adjusted according to the size of the panel to be fabricated with the content of the magnetic particles being directly proportional to the size of the panel fabricated.

Step S3: the mixture solution is applied on a surface of a first substrate to form a first black matrix layer by a spin coating or a transfer printing process.

Step S4: the first substrate obtained in step S3 is cured in a curing chamber.

Step S5: a pattern of first black matrix is formed on the first substrate by patterning the cured first black matrix layer by way of a photolithography process.

Step S6: the first substrate is disposed in a magnetizing chamber to be magnetized. The magnetizing chamber is applied with a magnetic field having a certain intensity such that the first magnetic particles in the first black matrix layer generate a uniform first magnetic polarity distribution.

The curing and magnetizing of the first black matrix can be performed altogether at once in a curing chamber with a certain intensity of magnetic field such that the first black matrix layer is cured and the first magnetic particles in the first black matrix layer generate a uniform first magnetic polarity distribution. Alternatively, the first black matrix layer can be pre-cured in a first pre-curing chamber such that the first magnetic particles in the first black matrix layer generate a uniform first magnetic polarity distribution, then the above substrate is further heated and cured in a main curing chamber.

Step S7: a pattern of a second black matrix is formed on a second substrate by repeating the processes of steps 1-5.

Step S8: the second substrate is magnetized in the magnetizing chamber such that the second magnetic particles in the second black matrix generate a uniform second magnetic polarity distribution. The second magnetic polarity is opposite to the first magnetic polarity.

Step S9: the position of first black matrix corresponds to that of the second black matrix, and the first substrate and the second substrate are cell assembled.

In the method, step S6 and step S8 may be not performed until step S9 is finished. Then the first black matrix and the second black matrix are magnetized.

In the method of fabricating the black matrix according to the above embodiment, the curing temperature in the curing process is preferably not greater than the Curie temperature of the magnetic particles to prevent the magnetism of the magnetic particles from disappearing. In addition, the magnetic particles preferably do not exhibit magnetism before curing to prevent influence on the distribution of the magnetic particles in the black matrix.

A display panel according to first embodiment is fabricated by using the above method.

The method of fabricating display panel using the magnetic units as other structures according to the second and third embodiments is substantially similar to the above fabricating method, which is not described herein in details.

In addition, the present disclosure further provides a display device including the display panel described in the above embodiments.

The display device can be any products or parts having a display function, such as a liquid crystal panel, an electronic paper, an OLED panel, a cell, phone, a tablet computer, a television, a monitor, a laptop computer, a digital photo frame, a GPS, and the like.

The present application claims the priority of China Patent Application No. 201410031108.7 filed on Jan. 22, 2014, which is incorporated herein by reference in its entirety as part of the present application.

What is claimed is:

1. A display panel, comprising:
a first substrate and a second substrate disposed to be cell assembled; and
a magnetic unit including a first magnetic subunit disposed on the first substrate and a second magnetic subunit disposed on the second substrate, the first magnetic subunit and the second magnetic subunit being disposed to be opposed to each other;
wherein first magnetic particles are dispersed in the first magnetic subunit; and second magnetic particles are dispersed in the second magnetic subunit; and
the first magnetic particles and the second magnetic particles have opposite magnetic polarities such that the first magnetic subunit and the second magnetic subunit attract each other;
wherein the first magnetic subunit is a black matrix, the first substrate is a color filter substrate, the second magnetic subunit is a spacer, and the second substrate is an array substrate.

2. The display panel of claim 1, wherein the first magnetic subunit and the second magnetic subunit have a matrix formed of a resin material, respectively;
the first magnetic particles are dispersed in the resin material of the first magnetic subunit;
the second magnetic particles are dispersed in the resin material of the second magnetic subunit.

3. The display panel of claim 1, wherein both the first magnetic subunit and the second magnetic subunit comprise a hard magnetic nano-particle layer and a soft magnetic metal shell layer; the soft magnetic metal shell layer has a permeability greater than a permeability of the hard magnetic nano-particle layer, and the soft magnetic metal shell layer is positioned both in periphery of the hard magnetic nano-particle layer and between the hard magnetic nano-particle layer and the substrate of the magnetic unit.

4. The display panel of claim 1, wherein both the first magnetic particles and the second magnetic particles are formed of a hard magnetic material.

5. The display panel of claim 4, wherein the first magnetic particles and the second magnetic particles have a particle diameter of 100-2000 nanometers, respectively.

6. The display panel of claim 2, wherein both the first magnetic subunit and the second magnetic subunit comprise a hard magnetic nano-particle layer and a soft magnetic metal shell layer; the soft magnetic metal shell layer has a permeability greater than a permeability of the hard magnetic nano-particle layer, and the soft magnetic metal shell layer is positioned both in periphery of the hard magnetic nano-particle layer and between hard magnetic nano-particle layer and the substrate of the magnetic unit.

7. The display panel of claim 1, wherein both the first magnetic subunit and the second magnetic subunit comprise a hard magnetic nano-particle layer and a soft magnetic metal shell layer; the soft magnetic metal shell layer has a permeability greater than a permeability of the hard magnetic nano-particle layer, and the soft magnetic metal shell layer is positioned both in periphery of the hard magnetic nano-particle layer and between the hard magnetic nano-particle layer and the substrate of the magnetic unit.

8. A display device comprising a display panel comprising:
a first substrate and a second substrate disposed to be cell assembled; and
a magnetic unit including a first magnetic subunit disposed on the first substrate and a second magnetic subunit disposed on the second substrate, the first magnetic subunit and the second magnetic subunit being disposed to be opposed to each other;
wherein first magnetic particles are dispersed in the first magnetic subunit; and second magnetic particles are dispersed in the second magnetic subunit; and
the first magnetic particles and the second magnetic particles have opposite magnetic polarities such that the first magnetic subunit and the second magnetic subunit attract each other;

wherein the first magnetic subunit is a black matrix, the first substrate is a color filter substrate, the second magnetic subunit is a spacer, and the second substrate is an array substrate.

9. The display device of claim 8, wherein the first magnetic subunit and the second magnetic subunit have a matrix formed of a resin material, respectively;
the first magnetic particles are dispersed in the resin material of the second magnetic subunit;
the second magnetic particles are dispersed in the resin material of the second magnetic subunit.

10. The display device of claim 8, wherein both the first magnetic subunit and the second magnetic subunit comprise a hard magnetic nano-particle layer and a soft magnetic metal shell layer; the soft magnetic metal shell layer has a permeability greater than a permeability of the hard magnetic nano-particle layer, and the soft magnetic metal shell layer is positioned both in periphery of the hard magnetic nano-particle layer and between the hard magnetic nano-particle layer and the substrate of the magnetic unit.

11. The display device of claim 8, wherein both the first magnetic particles and the second magnetic particles are formed of a hard magnetic material.

12. A method of fabricating a display panel comprising:
step S1, providinq a resin material, first magnetic particles and an organic solvent;
step S2, dissolving the resin material in the organic solvent and dispersing the first magnetic particles in the organic solvent dissolved with the resin material to form a mixture solution;
step S3, applying the mixture solution on a surface of a first substrate;
step S4, curing the mixture solution applied on the first substrate;
step S5, forming a pattern of a first magnetic subunit on the first substrate;
step S6, performing a magnetization treatment on the first substrate such that the first magnetic particles in the first magnetic subunit have a uniform first magnetic polarity;
step S7: forming a pattern of second magnetic subunit on a second substrate according to a process of steps 1-5;
step S8: performing a magnetization treatment on the second subtrate such that the second magnetic particles in the second magnetic subunit have a uniform second magnetic polarity, the second magnetic polarity being opposite to the first magnetic polarity; and
step S9: cell assembling the first substrate and the second substrate.

13. The method of claim 12, wherein step S6 and step S8 are performed after step S9 is finished.

\* \* \* \* \*